(12) United States Patent
Osterhout et al.

(10) Patent No.: US 7,571,930 B2
(45) Date of Patent: Aug. 11, 2009

(54) INFLATABLE CURTAIN AIRBAG INTEGRATED TETHER

(75) Inventors: Neal Osterhout, Sterling Heights, MI (US); Brian Downey, Westland, MI (US); Kristi Elliott-Rumberger, Canton, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 0 days.

(21) Appl. No.: 11/848,646

(22) Filed: Aug. 31, 2007

(65) Prior Publication Data

US 2009/0058053 A1 Mar. 5, 2009

(51) Int. Cl.
*B60R 21/16* (2006.01)
(52) U.S. Cl. .................................... 280/730.2
(58) Field of Classification Search .............. 280/730.2, 280/743.1, 743.2
See application file for complete search history.

(56) References Cited

U.S. PATENT DOCUMENTS

| | | | |
|---|---|---|---|
| 5,605,346 A | 2/1997 | Cheung et al. | |
| 5,797,621 A | 8/1998 | Ono | |
| 6,010,149 A | 1/2000 | Riedel et al. | |
| 6,155,597 A * | 12/2000 | Bowers et al. | 280/730.2 |
| 6,237,939 B1 * | 5/2001 | Resh | 280/730.2 |
| 6,273,458 B1 * | 8/2001 | Steffens et al. | 280/730.2 |
| 6,315,324 B1 | 11/2001 | Keshavaraj | |
| 6,361,068 B1 | 3/2002 | Stein et al. | |
| 6,375,214 B1 * | 4/2002 | Nishikaji | 280/728.2 |
| 6,457,745 B1 | 10/2002 | Heigl | |
| 6,464,250 B1 * | 10/2002 | Faigle et al. | 280/730.2 |
| 6,474,678 B1 * | 11/2002 | Boxey | 280/728.2 |
| 6,557,892 B2 | 5/2003 | Herzog | |
| 6,672,612 B2 | 1/2004 | Sauer et al. | |
| 6,688,641 B2 | 2/2004 | Dominissini | |
| 6,695,347 B2 | 2/2004 | Sonnenberg et al. | |
| 6,709,008 B2 * | 3/2004 | McGee et al. | 280/729 |
| 6,712,389 B2 | 3/2004 | Mauleon | |
| 6,783,155 B2 | 8/2004 | Keshavaraj | |
| 6,886,858 B2 | 5/2005 | Olsen | |
| 6,966,579 B2 | 11/2005 | Schneider et al. | |
| 6,991,255 B2 * | 1/2006 | Henderson et al. | 280/730.2 |
| 2001/0030418 A1 | 10/2001 | Keshavaraj | |
| 2002/0027353 A1 | 3/2002 | Keshavaraj | |
| 2002/0056978 A1 | 5/2002 | Keshavaraj | |
| 2003/0168835 A1 | 9/2003 | Thomas et al. | |
| 2004/0183286 A1 | 9/2004 | Kino | |
| 2006/0290122 A1 | 12/2006 | Woydick | |
| 2007/0046009 A1 | 3/2007 | Miura et al. | |

* cited by examiner

*Primary Examiner*—Faye M. Fleming
(74) *Attorney, Agent, or Firm*—Young Basile (57) ABSTRACT

An inflatable curtain airbag integrated tether and method of manufacture can include forming an inflatable curtain from at least one panel of material defining at least one expandable chamber, forming a tether integrally from a salvage area of the at one panel of material, and attaching the tether at an attachment point to the inflatable curtain at one end and having opposite end attachable to a structural pillar of the vehicle for anchoring the inflatable curtain during inflation. The side curtain airbag can be for installation in a stowed condition proximate a roof rail of a vehicle and adapted to be inflated to a deployed condition extending downward along an inner side surface of a passenger compartment of a vehicle.

21 Claims, 6 Drawing Sheets

INFLATABLE CURTAIN AIRBAG INTEGRATED TETHER

FIELD OF THE INVENTION

The invention relates to an inflatable side curtain airbag to be deployed downward along an inner side surface of a passenger compartment of a vehicle with an associated tether for controlling position of the inflatable curtain during deployment.

BACKGROUND

Tethers for controlling position of an inflatable curtain are generally known. Typically, these tethers are made separately from the inflatable curtain and are attached to the inflatable curtain in a separate manufacturing step at a desired location on the inflatable curtain. The opposite end of the tether typically is attached to the car body with a metal bracket.

SUMMARY

It would be desirable to create a tether by cutting a pattern out of a salvage area on the front, rear, or bottom of the inflatable curtain material. The side curtain airbag to be deployed downward along an inner side surface of a passenger compartment of the vehicle can include at least one panel of material defining an inflatable curtain having at least one expandable chamber, a tether integrally formed from a salvaged area of the at least one panel of material and attachable to a structural pillar of the vehicle for anchoring the curtain during inflation.

A side curtain airbag can include an inflatable curtain having at least one expandable chamber to be installed within a vehicle in a stowed condition proximate a roof rail of the vehicle, and when inflated, the chamber can expand from the stowed condition to a deployed condition generally in front of an adjacent side of the vehicle, and the tether attached to the inflatable curtain at one end and attachable to structural pillar of the vehicle at an opposite end for anchoring the inflatable curtain during inflation. The tether is formed from a salvage area of the inflatable curtain.

A method for making a side curtain airbag for installation in a stowed condition proximate a roof rail of a vehicle and to be inflated to a deployed condition extending downward along an inner side surface of a passenger compartment of a vehicle can include forming an inflatable curtain from at least one panel of material defining at least one expandable chamber, forming a tether integrally from a salvage area of the at least one panel of material, and attaching the tether at an attachment point to an inflatable curtain at one end and having an opposite end attachable to a structural pillar of the vehicle for anchoring the inflatable curtain during inflation.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DETAILED DESCRIPTION

Figures 1, 2, 3:
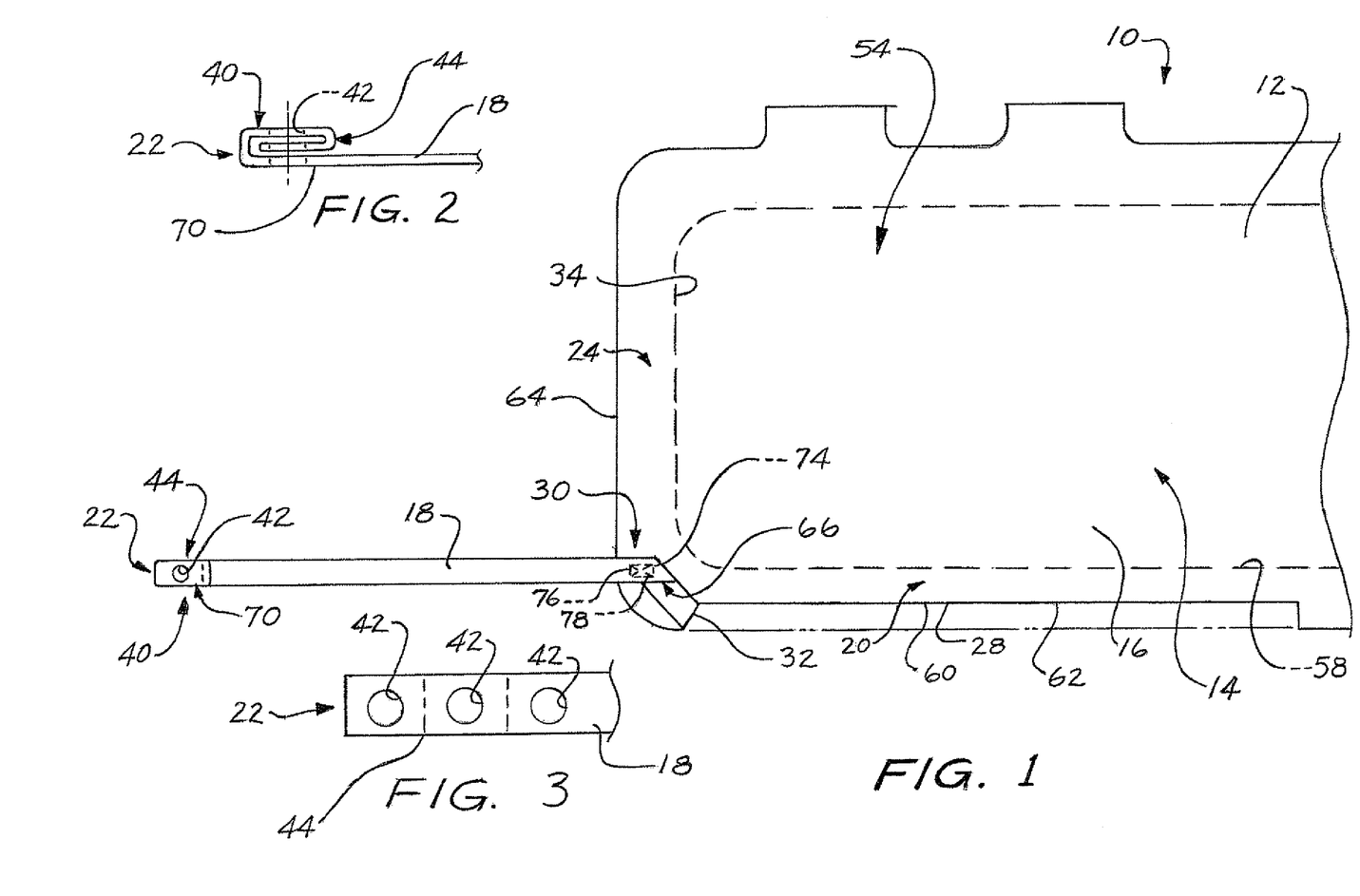
FIG. 1 is a plan view illustrating a tether being created by taking part of a salvage area along a bottom portion of an airbag curtain or cushion and folding the tether inboard or outboard and forward or rearward.
FIG. 2 is a folded detail of the tether-mounting tab created by folding over the material multiple times to create a tab in which a mechanical fastener can be used to fasten an outer end of the tether to a vehicle pillar.
FIG. 3 is an unfolded detail of the tether-mounting tab illustrating a plurality of apertures which are coaxially aligned with one another when folded and sewn as illustrated in FIGS. 1 and 2.
Figure 4:
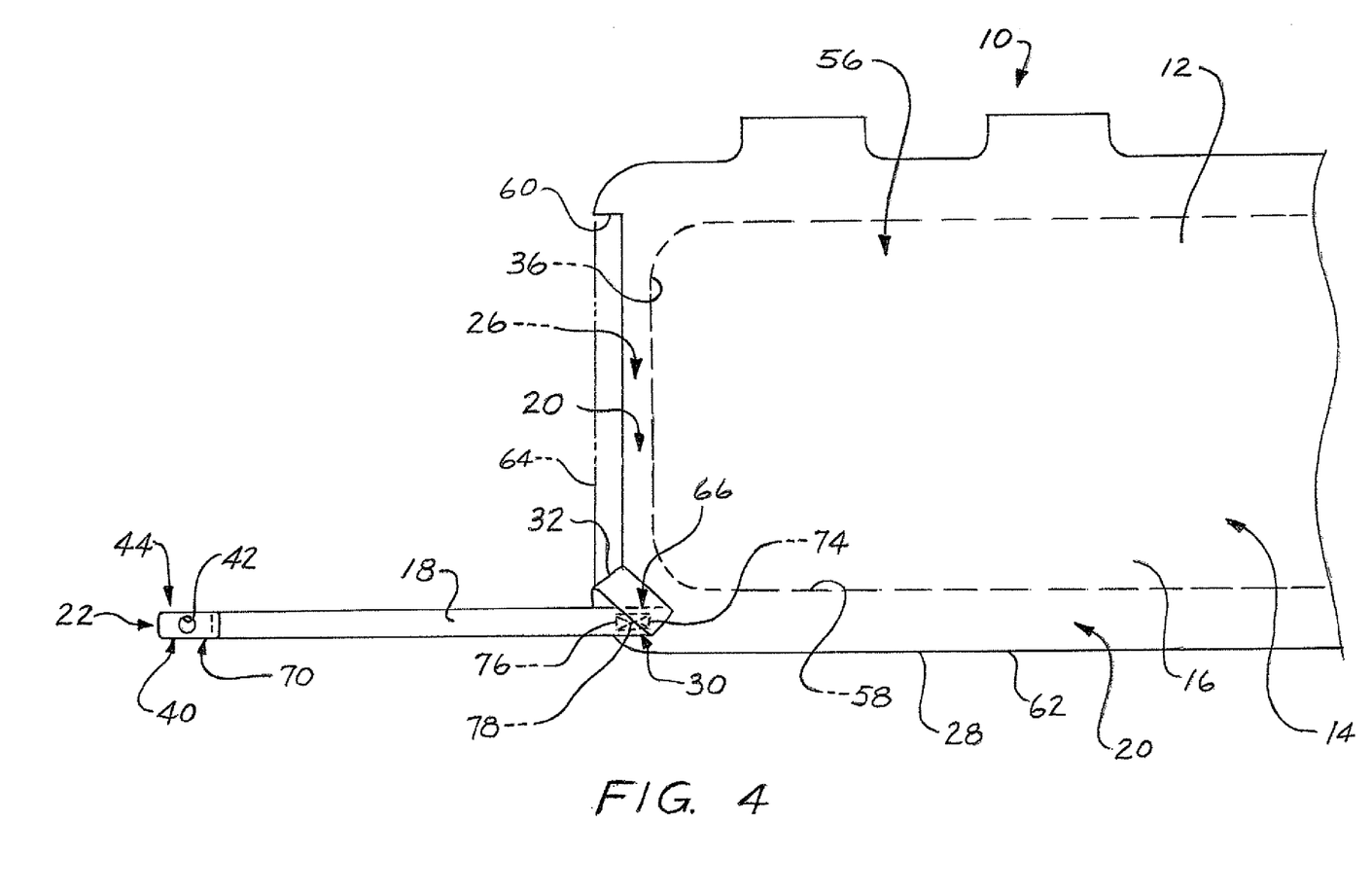
FIG. 4 is a plan view of a tether being created by taking part of a salvage area along a front or rear side edge of an airbag curtain or cushion, the tether-mounting tab being created by folding over the material multiple times to create a tab in which a mechanical fastener can be used to fasten an outer end of the tether to a vehicle pillar, and an inner end of the tether remaining connected to the salvage area and routed to a desired location by folding inboard or outboard and toward a lower edge, then folding forward or rearward where the tether material is sewn at a tether attachment point to the airbag curtain or cushion.
Figure 5:
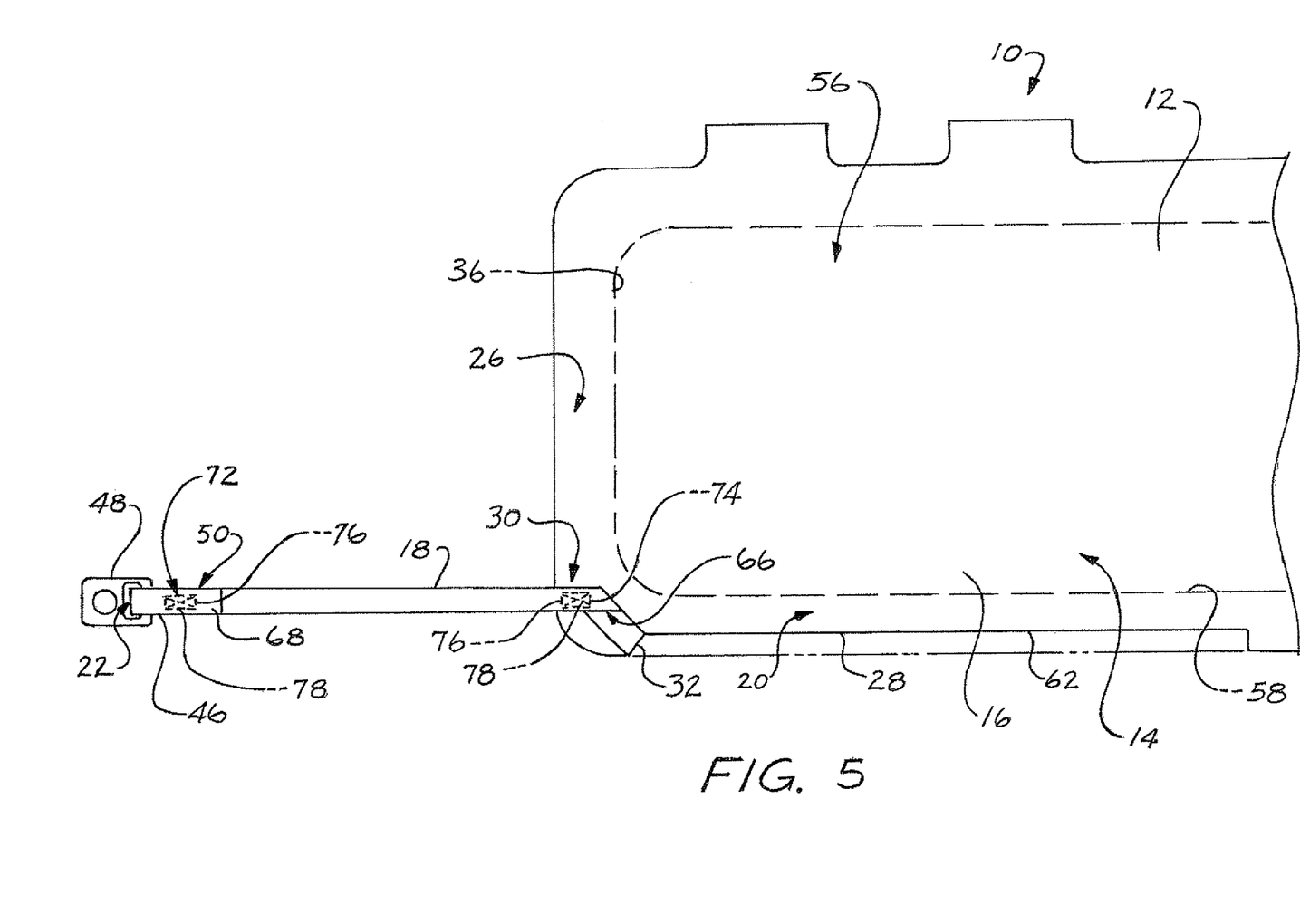
FIG. 5 is a plan view of a tether being created by taking part of a salvage area along a bottom portion of an airbag curtain or cushion, a tether-mounting tab being created by folding over and forming a loop for attachment to a metal tether bracket and sewn to hold the bracket with respect to an outer end of the tether, an inner end of the tether remaining connected to the salvage area and routed by folding inboard or outboard and toward a side edge, then folding forward or rearward to a desired tether attachment point where the tether is sewn to the airbag curtain or cushion.
Figure 6:
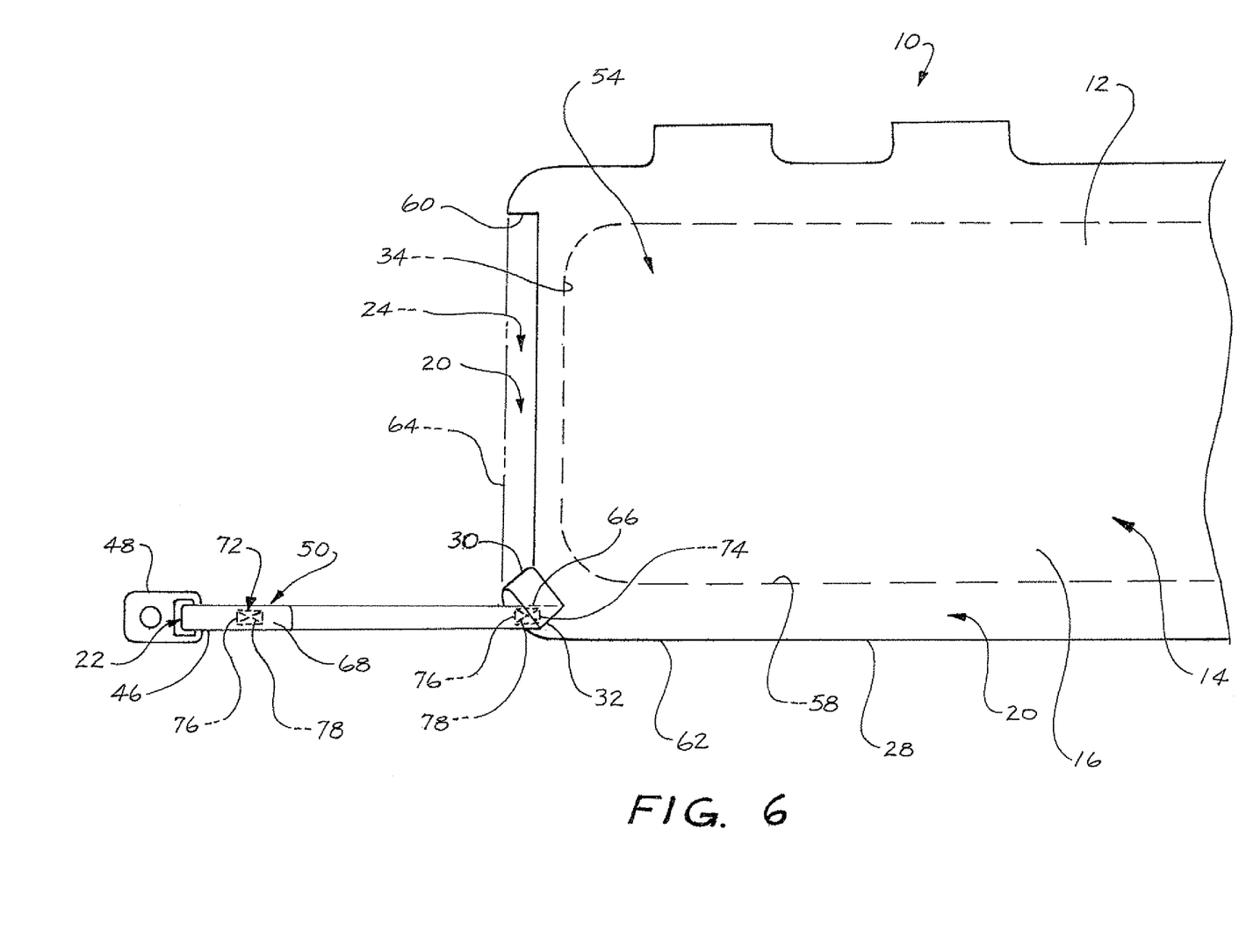
FIG. 6 is a plan view illustrating a tether being created by taking part of a salvage area from a front or rear side portion of an airbag curtain or cushion, a tether-mounting tab being created by folding over the material to form a loop which is sewn to secure a metal tether bracket to an outer end of the tether, an inner end of the tether remaining connected to the salvage area and routed by folding inboard or outboard and toward a lower edge, then folding forward or rearward to a desired tether attachment point where the tether is sewn to the airbag curtain or cushion.
Figures 7, 8, 9:
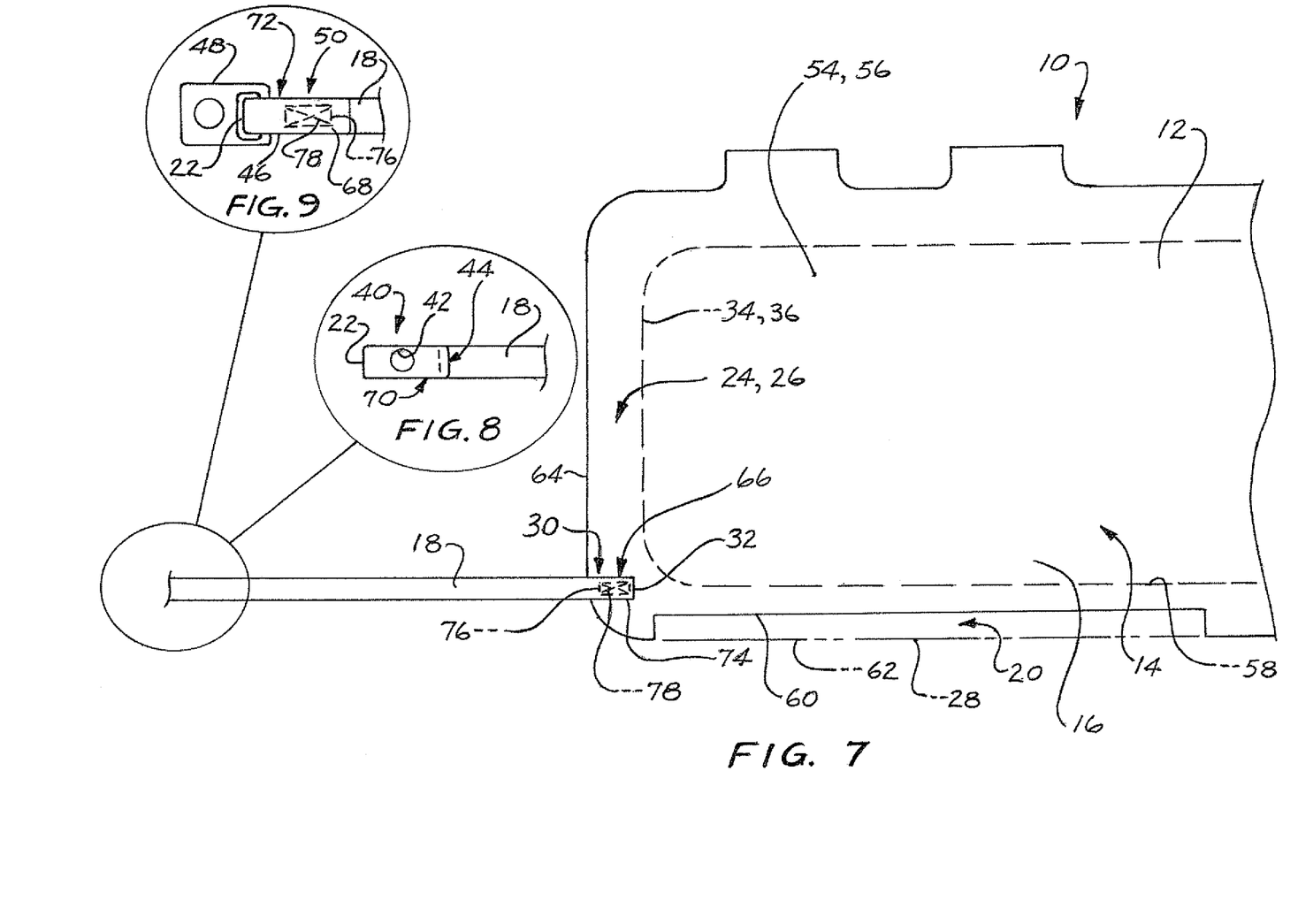
FIG. 7 is a plan view illustrating a tether being created by taking part of a salvage area along a bottom portion of an airbag curtain or cushion, the tether having mounting tab being created on an outer end as illustrated in either FIG. 8 or FIG. 9, and an inner end of the tether being separated from the salvage area and positioned on an inboard side or outboard side at a desired tether attachment point where the inner end of the tether is sewn to the airbag curtain or cushion.
FIG. 8 is a detailed view of an outer end of the tether being folded over multiple times to create a tab in which a mechanical fastener can be used to fasten the outer end of the tether to a vehicle pillar.
FIG. 9 is a detailed view of an outer end of the tether being folded over to form a loop and sewn to attach a metal tether bracket to the end which can be used to fasten the outer end of the tether to a vehicle pillar.
Figures 10, 11, 12:
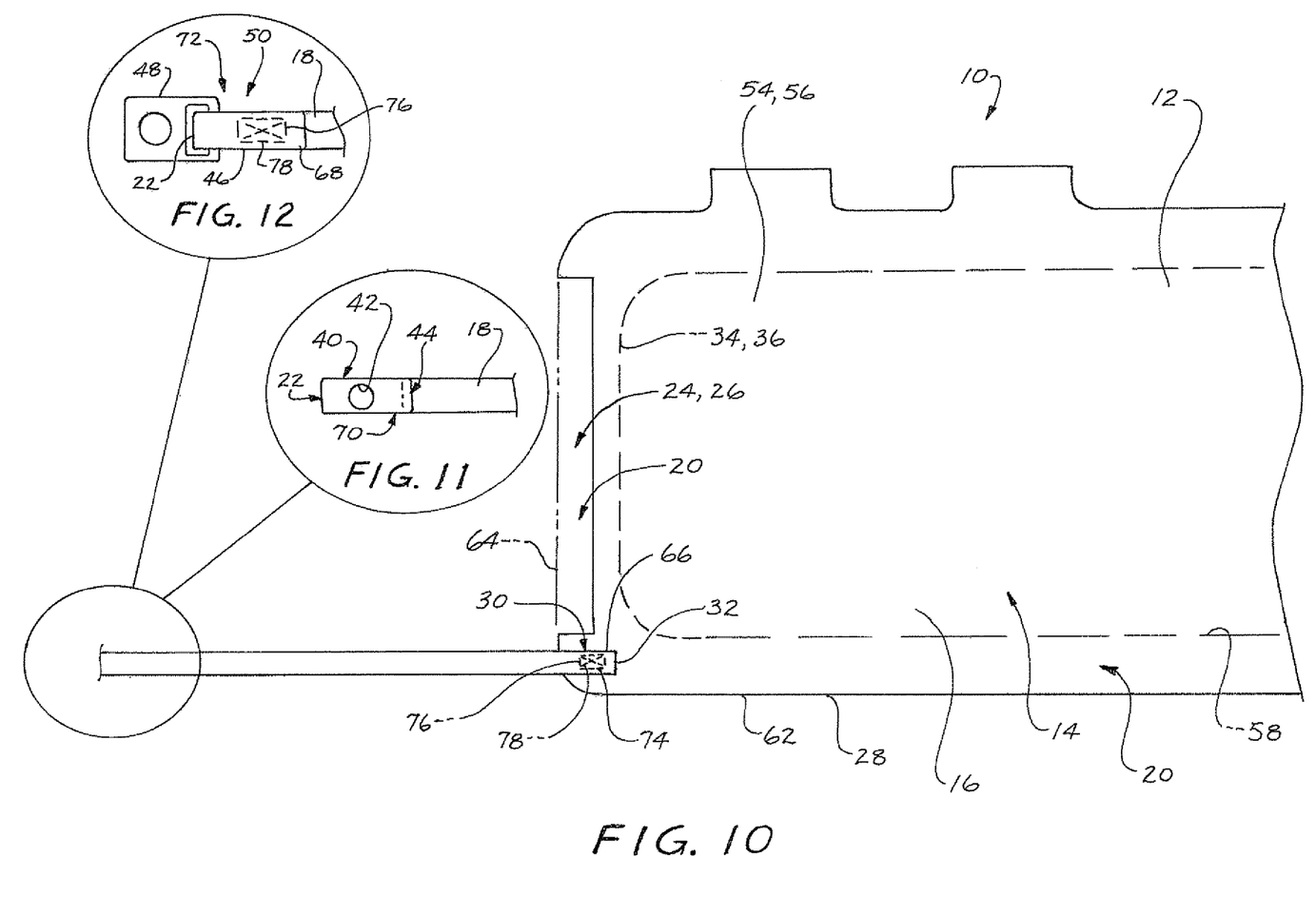
FIG. 10 is a plan view illustrating a tether being created by taking part of a salvage area along a front or rear side edge of an airbag curtain or cushion, a tether having mounting tab being created as illustrated in either FIG. 11 or FIG. 12 at an outer end which can be used to fasten the tether to a vehicle pillar, an inner end of the tether being separated from the salvage area and positioned on an inboard side or outboard side at a desired tether attachment point where the inner end of the tether can be sewn to the airbag curtain or cushion.
FIG. 11 is a detailed view of a tether having mounting tab being created by folding over the material multiple times to create a tab in which a mechanical fastener can be used to fasten the tether to a vehicle pillar.
FIG. 12 is a detailed view of a tether having mounting tab being created by folding over the material to create a loop for attachment of a metal tether bracket, when loop material is sewn to maintain the metal tether bracket attached to the loop, where the metal tether bracket can be used to fasten the outer end of the tether to a vehicle pillar.

Referring now to FIGS. 1-12, a side curtain airbag 10 to be deployed downward along an inner side surface of a passenger compartment of a vehicle can include at least one panel 12 of material defining an inflatable curtain 14 having at least one expandable chamber 16. A tether 18 is formed from a salvage area 20 of the at least one panel 12 of material and is attachable to a structural pillar of the vehicle at an outer end 22 for anchoring the side curtain airbag 10 during inflation. The tether 18 can be formed from a salvage area 20 along a portion of the at least one panel 12 selected from a group consisting of a front or rear salvage area 24, 26 (as illustrated in FIGS. 4, 6, or 10), and a bottom salvage area 28 (as illustrated in FIGS. 1, 5, or 7) of the panel 12, and any combination thereof As illustrated in FIGS. 7 and 10 the tether 18 can be detached from salvage area 20 of the at least one panel 12 of material. The tether 18 can be attached to the panel 12 defining the inflatable curtain 14 at any desired tether attachment point 30 location at an inner end 32 of the tether 18. As illustrated in FIGS. 1, 4, 5, and 6, the tether 18 can remain intact with the salvage area 20 of the at least one panel 12 of material. The tether 18 can be routed upward and outward and then extend outward as illustrated in FIGS. 1 and 5 on either the inboard side or outboard side of the inflatable curtain 14 to any desired tether attachment point 30, where the tether 18 can be attached to the panel 12 by being folded and sewn. The tether 18 remaining intact with the salvage area 20 of the at least one panel 12 of material can alternatively be routed downward and inward, and then extend outward as illustrated in FIGS. 4 and 6 on either the inboard or the outboard side of the inflatable curtain 14, where the tether can be attached to the panel 12 by being folded and sewn at any desired tether attachment point 30.

The tether attachment point 30 can be defined by a reinforced attachment structure providing material thicknesses at the attachment point 30 of the tether 18 to the panel 12 of material, where the tether is folded over on itself at least once at the tether attachment point 30. The tether attachment point 30 can be located either forward of a front seam 34 or rearward of a rear seam 36 of the inflatable curtain 14 and on either the inboard side or the outboard side of the curtain 14.

An outer end 22 of the tether 18 can be folded over on itself in sufficient layers to create a tether mounting tab 40 as best seen in FIGS. 1-4, 8, and 11. As illustrated in FIGS. 1-4, 8 and 11, the tether mounting tab 40 can include at least one mounting aperture 42 formed therein, through which a mechanical fastener can be used to fasten the outer end 22 of the tether 18 to a structural pillar of a vehicle. The tether mounting tab 40 can be formed with a roll fold 44 as best seen in FIGS. 2 and 3, and also illustrated in FIGS. 1-4, 8, and 11. As illustrated in FIGS. 5, 6, 9, and 12, the tether mounting tab 40 can be folded to define a loop 46 in which a metal tether bracket 48 can be secured by a sewn area 50, where the metal tether bracket 48 can be used to fasten the outer end 22 of the tether 18 to a vehicle pillar.

The inflatable curtain 14 has at least one expandable chamber 16 and is adapted to be installed within a vehicle in stowed condition proximate a roof rail of the vehicle. When inflated, the chamber 16 expands from the stowed condition to a deployed condition with the inflatable curtain 14 in front of an adjacent side of the vehicle. Tether 18 is attached to the inflatable curtain 14 at one end 32 and is attachable to a structural pillar of the vehicle at an opposite end 22 for anchoring the inflatable curtain 14 during inflation. A method for making a side curtain airbag 10 for installation in a stowed condition proximate a roof rail of the vehicle and to be inflated to a deployed condition extending downward along an inner side surface of a passenger compartment of a vehicle can include forming an inflatable curtain 14 from at least one panel of material 12 defining at least one expandable chamber 16, forming a tether 18 from a salvage area 20 of the at least one panel 12 of material, and attaching the tether 18 at an attachment point 30 to the inflatable curtain at one end 32 and having an opposite end 22 attachable to a structural pillar of the vehicle for anchoring the inflatable curtain 14 during inflation.

The method for making a side curtain airbag 10 can include forming a tether 18 from salvage area 20 along an area of the at least one panel 12 selected from a group consisting of a front or rear salvage area 24, 26, and a bottom salvage area 28 of the panel 12. The tether 18 can either be detached from the salvage area 20 of the at least one panel 12 of material and subsequently attached at an inner end 32 of the tether 18 to the at least one panel 12 defining inflatable curtain 14 at a desired location or attachment point 30, either on an inboard side or an outboard side, or the tether 18 can have a portion 32 left integrally intact with the salvage area 20 of the at least one panel 12 of material, such that the tether 18 is routed to a desired location or attachment point 30 on the at least one panel 12 defining the inflatable curtain 14, and subsequently attached to the at least one panel 12 at a desired location or attachment point 30, either on an inboard side or an outboard side.

The method can include folding an outer end 22 of the tether 18 over on itself in sufficient layers to create a reinforced mounting tab 40. At least one mounting aperture 42 can be formed in the reinforced mounting tab 40. The mounting aperture 42 created in the mounting tab 40 can be of sufficient size to receive a mechanical fastener used to fasten the tether 18 to a vehicle pillar, The method can include forming the attachment point 30 of the tether 18 on an inboard side 54 of the airbag 10. Alternatively, the method can include forming the attachment point 30 of the tether 10 on an outboard side 56 of the airbag 10. The method can also include forming the attachment point 30 of the tether 18 at most no higher than a lower edge 58 of the expandable chamber 16 of the airbag 10. The attachment point 30 of the tether 10 can be formed spaced apart from a cut line 60 along which the salvage area 20 is cut to form the tether 10 of the airbag 10. The attachment point 30 of the tether 10 can be formed spaced apart from a bottom edge 62 of the airbag 10. The attachment point 30 of the tether 18 can be formed spaced apart from a front or rear side edge 64 of the airbag 10.

The method can include folding the attachment point 30 of the tether 10, either inboard or outboard, downward toward a lower edge 62 of the airbag 10, then folding the tether 18 outward extending toward a front or rear side edge 64 of the airbag 10, and sewing the tether 18 to the airbag 10 through overlapping layers 66 formed by the folds, as best seen in FIGS. 4 and 6. In another embodiment, the method can include folding the attachment point 30 of the tether 18 upward toward a front or rear side edge 64 of the airbag 10, either inboard or outboard, then folding the tether 18 outward extending toward a front or rear side edge 64 of the airbag 10, and sewing the tether 18 to the airbag 10 through overlapping layers 66 formed by the folds as best seen in FIGS. 1 and 5.

The method can include folding the opposite end 22 of the tether 18 toward a lower edge 62 of the airbag 10, then folding the tether 18 toward a front edge 64 of the airbag 10, and sewing the tether 18 to the airbag 10 through overlapping layers 66 formed by the folds, as best seen in FIG. 4 and 6.

The method can also include passing the opposite end 22 of the tether 18 through a mounting bracket 48, folding the opposite end 22 of the tether 18 on itself, and sewing the tether 18 to the bracket 48 through overlapping layers 68 formed by the folds as best seen in FIGS. 5, 6, 9 and 12.

The method can include roll-folding the opposite end 22 of the tether 18 on itself to form overlapping layers 70, sewing the overlapping layers 70 formed by the roll-folded end 44 together, and forming an aperture 42 in the tether 18 through the overlapping layers 70 formed by the roll-fold 44 for attachment with a fastener to a bracket and/or a frame member of the vehicle.

The method can form the tether 18 from the salvage area 20 trimmed as excess from the at one least one panel 12 of material used to form the side curtain airbag 10. The attachment point 30 of the tether 18 or the attachment point 72 of the bracket 48 to the tether 18 can be a sewn pattern 74, where the pattern 74 is a square shape 76 with an internal X pattern 78. The method can include sewing a pattern 74 at the attachment point 30 or 72 of the tether 18 where the pattern 74 is entirely located on the tether 18. A pattern 74 can be sewn to pass at least partially through two layers of tether 18 and one layer of airbag 10 at the attachment point 30. A pattern 74 can be sewn at the attachment point 30 of the tether 18, where the tether 18 is not entirely removed from the airbag 10, and the pattern 74 passes at least partially through at least three layers of material.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A method for making a side curtain airbag for installation in a stowed condition proximate a roof rail of a vehicle and to be inflated to a deployed condition extending downward along an inner side surface of a passenger compartment of a vehicle comprising:
    forming an inflatable curtain from at least one panel of material defining at least one expandable chamber;
    forming a tether from a salvage area of the at least one panel of material;
    attaching the tether at an attachment point to the inflatable curtain at one end; and
    roll folding an opposite end of the tether on itself to form overlapping layers and sewing the overlapping layers formed by the roll-fold together, the opposite end attachable to a structural pillar of the vehicle for anchoring the inflatable curtain during inflation.

2. The method of claim 1 further comprising:
    forming the tether from a salvage area along an area of the at least one panel selected from a group consisting of a front salvage area, a rear salvage area, and a bottom salvage area of the panel.

3. The method of claim 1 further comprising:
    detaching the tether from the salvage area of the at least one panel of material; and
    attaching one end of the tether to the at least one panel defining the inflatable curtain at a desired location.

4. The method of claim 1 further comprising:
    leaving a portion of the tether intact with the salvage area of the at least one panel of material;
    routing the tether to a desired location on the at least one panel defining the inflatable curtain; and
    attaching the tether to the at least one panel at a desired location.

5. The method of claim 1 further comprising;
    forming a mounting aperture in the overlapping layers.

6. The method of claim 1 further comprising:
    forming the attachment point of the tether at most no higher than a lower edge of the expandable chamber of the airbag.

7. The method of claim 1 further comprising:
    forming the attachment point of the tether spaced apart from a cut line of the airbag.

8. The method of claim 1 further comprising:
    forming the attachment point of the tether spaced apart from a bottom edge of the airbag.

9. The method of claim 1 further comprising:
    forming the attachment point of the tether spaced apart from a front edge of the airbag.

10. The method of claim 1 further comprising:
    forming the tether as trimmed excess from the salvage area.

11. The method of claim 1 further comprising:
    sewing a pattern at the attachment point of the tether, where the pattern is a square shape with internal "X" pattern.

12. The method of claim 1 further comprising:
    sewing a pattern at the attachment point of the tether, where the pattern is entirely located on the tether.

13. The method of claim 1 further comprising:
    sewing a pattern at the attachment point of the tether, where the tether is not entirely removed from the airbag, and the pattern passes at least partially through at least three layers of material.

14. The method of claim 13 further comprising:
    passing the pattern at least partially through two layers of tether and one layer of airbag.

15. A side curtain airbag to be deployed downward along an inner side surface of a passenger compartment of a vehicle comprising:
    at least one panel of material defining an inflatable curtain having at least one expandable chamber; and
    a tether formed from a salvage area of the at least one panel of material, the tether having a tether mounting tab formed from at least two roll folded layers of the tether at an outer end thereof, and the tether mounting tab having an aperture that extends through each layer of said at least two roll folded layers, wherein a fastener is receivable in the aperture for anchoring the curtain to a structural pillar of the vehicle during inflation.

16. The side curtain airbag of claim 15, wherein the tether is formed from a salvage area along an area of the at least one panel selected from a group consisting of a front salvage area, a rear salvage area, and a bottom salvage area of the panel.

17. The side curtain airbag of claim 15, wherein the tether is detached from the salvage area of the at least one panel of material, and attached to the at least one panel defining the inflatable curtain at a desired location at one end of the tether.

18. The side curtain airbag of claim 15, wherein the tether remains intact with the salvage area of the at least one panel of material, the tether being routed and attached to the at least one panel defining the inflatable curtain at a desired location.

19. The side curtain airbag of claim 15 further comprising:
a reinforced attachment structure providing multiple material thickness at an attachment point of the tether to panel of material.

20. The side curtain airbag of claim 19, wherein the attachment point is located forward of a front seam of the inflatable curtain.

21. The side curtain airbag of claim 19, wherein the attachment point is located rearward of a rear seam of the inflatable curtain.

* * * * *